United States Patent
Helms et al.

(10) Patent No.: US 11,429,642 B2
(45) Date of Patent: Aug. 30, 2022

(54) SYSTEMS AND METHODS FOR DYNAMIC HIERARCHICAL METADATA STORAGE AND RETRIEVAL

(71) Applicant: Walmart Apollo, LLC, Bentonville, AR (US)

(72) Inventors: Chad Helms, Bentonville, AR (US); Andrew Weaver, Rogers, AR (US); Benjamin Tucker, Bella Vista, AR (US); Paul David, Centerton, AR (US); Mike Dean Atchley, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 775 days.

(21) Appl. No.: 16/177,712

(22) Filed: Nov. 1, 2018

(65) Prior Publication Data

US 2019/0130020 A1 May 2, 2019

Related U.S. Application Data

(60) Provisional application No. 62/580,187, filed on Nov. 1, 2017.

(51) Int. Cl.
*G06F 7/00* (2006.01)
*G06F 17/30* (2006.01)
(Continued)

(52) U.S. Cl.
CPC .............. *G06F 16/285* (2019.01); *G06F 8/34* (2013.01); *G06F 8/35* (2013.01); *G06F 9/451* (2018.02); *G06F 16/288* (2019.01)

(58) Field of Classification Search
CPC ...... G06F 16/285; G06F 9/451; G06F 16/288; G06F 8/34; G06F 8/35
(Continued)

(56) References Cited

U.S. PATENT DOCUMENTS

| 4,984,155 A | 1/1991 | Geier et al. |
| 5,390,284 A | 2/1995 | Ogata et al. |

(Continued)

FOREIGN PATENT DOCUMENTS

| WO | WO 1993/004449 A1 | 3/1993 |
| WO | WO 2007/081925 A1 | 7/2007 |
| WO | WO 2015/065260 A1 | 5/2015 |

OTHER PUBLICATIONS

Application and Filing Receipt for U.S. Appl. No. 14/213,951, filed Mar. 14, 2014, Inventor(s): Ray et al.
(Continued)

*Primary Examiner* — Binh V Ho
(74) *Attorney, Agent, or Firm* — Patterson Thuente Pedersen, P.A.

(57) ABSTRACT

Embodiments include a data platform for attribute management related to a key-attribute-value data store. An attribute repository comprises attributes grouped by classifications. A hierarchical object definition repository comprises a plurality of object definitions, each having associated classifications. Objects in an object repository are associated with definitions. An attribute value repository stores values for each attribute object pair. APIs can provide attribute metadata, and automatically generate forms based on object definitions. The data platform can provide a product data platform linking products, product offerings, trade items, and supply items.

17 Claims, 16 Drawing Sheets

(51) Int. Cl.
    *G06F 16/28*      (2019.01)
    *G06F 9/451*      (2018.01)
    *G06F 8/34*       (2018.01)
    *G06F 8/35*       (2018.01)

(58) Field of Classification Search
    USPC ........................................................ 707/737
    See application file for complete search history.

(56) References Cited

U.S. PATENT DOCUMENTS

| | | | |
|---|---|---|---|
| 5,420,978 A * | 5/1995 | Tozawa | G06Q 10/109 |
| | | | 700/83 |
| 5,497,486 A | 3/1996 | Stolfo et al. | |
| 5,819,291 A | 10/1998 | Haimowitz et al. | |
| 5,930,764 A | 7/1999 | Melchione et al. | |
| 6,016,499 A * | 1/2000 | Ferguson | G06F 16/252 |
| | | | 707/999.102 |
| 6,182,082 B1 * | 1/2001 | Tanaka | G06F 16/289 |
| | | | 707/999.102 |
| 6,212,524 B1 | 4/2001 | Weissman et al. | |
| 6,295,541 B1 | 9/2001 | Bodnar et al. | |
| 6,336,117 B1 | 1/2002 | Massarani | |
| 6,377,288 B1 * | 4/2002 | Moran | G06F 3/04883 |
| | | | 715/849 |
| 6,405,211 B1 * | 6/2002 | Sokol | G06F 40/289 |
| | | | 707/999.102 |
| 6,477,521 B1 | 11/2002 | Kumomura et al. | |
| 6,865,577 B1 | 3/2005 | Sereda | |
| 6,901,406 B2 | 5/2005 | Nabe et al. | |
| 6,959,286 B2 | 10/2005 | Perkowski | |
| 6,965,865 B2 | 11/2005 | Pletz et al. | |
| 6,988,093 B2 | 1/2006 | Pic et al. | |
| 7,069,231 B1 | 6/2006 | Cinarkaya et al. | |
| 7,152,060 B2 | 12/2006 | Borthwick et al. | |
| 7,519,635 B1 | 4/2009 | Haustein et al. | |
| 7,549,052 B2 | 6/2009 | Haitsma et al. | |
| 7,577,907 B2 | 8/2009 | Vishnia-Shabtai et al. | |
| 7,860,968 B2 | 12/2010 | Bornhoevd et al. | |
| 7,886,124 B2 | 2/2011 | Muthulingam et al. | |
| 7,899,796 B1 | 3/2011 | Borthwick et al. | |
| 7,921,086 B1 | 4/2011 | Bromley et al. | |
| 8,015,163 B2 | 9/2011 | Welingkar et al. | |
| 8,127,109 B2 | 2/2012 | Matze | |
| 8,131,749 B2 | 3/2012 | Sayfan | |
| 8,175,908 B1 | 5/2012 | Anderson | |
| 8,204,867 B2 | 6/2012 | Benhase et al. | |
| 8,219,446 B1 | 7/2012 | Mowry | |
| 8,225,221 B2 * | 7/2012 | Beran | G06F 16/289 |
| | | | 717/102 |
| 8,234,468 B1 | 7/2012 | Deshmukh et al. | |
| 8,275,770 B2 | 9/2012 | Bayliss | |
| 8,301,610 B2 | 10/2012 | Driesen et al. | |
| 8,312,028 B2 | 11/2012 | Canora et al. | |
| 8,359,337 B2 | 1/2013 | Anumakonda et al. | |
| 8,364,652 B2 | 1/2013 | Vijayan et al. | |
| 8,386,529 B2 | 2/2013 | Chaudhuri et al. | |
| 8,522,206 B2 | 8/2013 | Chan et al. | |
| 8,554,592 B1 | 10/2013 | Merz | |
| 8,621,382 B2 | 12/2013 | Young et al. | |
| 8,645,399 B2 | 2/2014 | McNeill et al. | |
| 9,031,901 B1 | 5/2015 | King et al. | |
| 9,576,262 B2 | 2/2017 | Ganguly et al. | |
| 9,830,377 B1 | 11/2017 | Ray et al. | |
| 10,007,689 B1 | 6/2018 | Ray et al. | |
| 2002/0007284 A1 | 1/2002 | Schurenberg et al. | |
| 2002/0026339 A1 * | 2/2002 | Frankland | H04L 67/42 |
| | | | 707/E17.108 |
| 2002/0073138 A1 | 6/2002 | Gilbert et al. | |
| 2002/0161734 A1 * | 10/2002 | Stauber | G06F 9/465 |
| 2002/0169934 A1 | 11/2002 | Krapp et al. | |
| 2003/0023963 A1 * | 1/2003 | Birkholz | G06F 8/65 |
| | | | 717/172 |
| 2003/0093333 A1 | 5/2003 | Veeneman | |
| 2003/0097359 A1 | 5/2003 | Ruediger | |
| 2003/0195836 A1 | 10/2003 | Hayes et al. | |
| 2004/0093323 A1 * | 5/2004 | Bluhm | G06F 16/9535 |
| 2004/0107205 A1 | 6/2004 | Burdick et al. | |
| 2004/0139001 A1 | 7/2004 | Henriques et al. | |
| 2004/0172393 A1 | 9/2004 | Kazi et al. | |
| 2005/0256798 A1 * | 11/2005 | Herter | G06Q 30/0601 |
| | | | 705/37 |
| 2006/0020611 A1 | 1/2006 | Gilbert et al. | |
| 2006/0080283 A1 | 4/2006 | Shipman | |
| 2006/0111135 A1 | 5/2006 | Gray et al. | |
| 2006/0179050 A1 | 8/2006 | Giang et al. | |
| 2006/0248048 A1 | 11/2006 | Jain et al. | |
| 2007/0013968 A1 | 1/2007 | Ebaugh et al. | |
| 2008/0005141 A1 | 1/2008 | Zheng et al. | |
| 2008/0098083 A1 | 4/2008 | Shergill et al. | |
| 2008/0120271 A1 | 5/2008 | Hunt et al. | |
| 2008/0294996 A1 | 11/2008 | Hunt et al. | |
| 2009/0106245 A1 | 4/2009 | Salcedo | |
| 2009/0157749 A1 | 6/2009 | Lessing et al. | |
| 2009/0234826 A1 | 9/2009 | Bidlack | |
| 2009/0271359 A1 | 10/2009 | Bayliss | |
| 2010/0106724 A1 | 4/2010 | Anderson | |
| 2011/0153327 A1 | 6/2011 | Lasso | |
| 2011/0153667 A1 | 6/2011 | Parmenter et al. | |
| 2011/0238488 A1 | 9/2011 | Hahn | |
| 2011/0246238 A1 | 10/2011 | Vdovjak et al. | |
| 2012/0084268 A1 | 4/2012 | Vijayan et al. | |
| 2012/0086544 A1 | 4/2012 | Kemp | |
| 2012/0203708 A1 | 8/2012 | Psota et al. | |
| 2012/0246154 A1 | 9/2012 | Duan et al. | |
| 2012/0246175 A1 | 9/2012 | Duan et al. | |
| 2013/0124361 A1 | 5/2013 | Bryson | |
| 2013/0124474 A1 | 5/2013 | Anderson | |
| 2013/0151537 A1 | 6/2013 | Woody et al. | |
| 2013/0173402 A1 | 7/2013 | Young | |
| 2013/0212103 A1 | 8/2013 | Cao et al. | |
| 2014/0279739 A1 | 9/2014 | Elkington et al. | |
| 2014/0279947 A1 | 9/2014 | Chachra et al. | |
| 2015/0039600 A1 | 2/2015 | Walters et al. | |
| 2015/0234830 A1 | 8/2015 | Bergman | |
| 2016/0179869 A1 * | 6/2016 | Hutchins | G06F 16/211 |
| | | | 707/703 |
| 2018/0308145 A1 | 10/2018 | Tucker et al. | |

OTHER PUBLICATIONS

Application and Filing Receipt for U.S. Appl. No. 14/214,204, filed Mar. 14, 2014, Inventor(s): Ray et al.

Application and Filing Receipt for U.S. Appl. No. 15/956,106, filed Apr. 18, 2018, Inventor(s): Tucker et al.

Application and Filing Receipt for U.S. Appl. No. 14/214,053, filed Mar. 14, 2014, Inventors: Ray et al.

Oracle Product Information Management Implementation Guide; Release 12.1 Part No. E13108-10; https://docs.oracle.com/cd/E18727_01/doc.121/e13108/T381249T381418.htm; [retrieved Nov. 28, 2018]; 33 pages.

International Search Report and Written Opinion for corresponding International Application No. PCT/US2018/058640 dated Jan. 16, 2019; 9 pages.

* cited by examiner

| Row Key 410 | Info 412 | | Relation 414 | Classification 416 | Attributes 418 | |
|---|---|---|---|---|---|---|
| M1 | objectDefinitionID | market | C_S1 | entity | name | US Market |
|  | userKey | US | C_S2 |  market |  |  |
|  |  |  | C_S3 |  |  |  |
| S1 | objectDefinitionID | segment | P_M1 | entity | Name | Warehouse |
|  | userKey | 1 | C_10 | segment |  |  |
| S2 | objectDefinitionID | segment | P_M1 | entity | Name | Online |
|  | userKey | 2 | C_10 | segment |  |  |
| S3 | objectDefinitionID | segment | P_M1 | entity | name | Retail |
|  | userKey | 3 |  | segment |  |  |
| D87 | objectDefinitionID | department | P_S3 | entity | name | Wireless |
|  | userKey | 87 | C_F665 | department |  |  |
|  |  |  | C_F667 |  |  |  |
|  |  |  | C_F662 |  |  |  |
| F665 | objectDefinitionID | fineline | P_D87 | entity | name | Postpaid Sprint |
|  | userKey | 665 | C_10 | fineline | carrier | Sprint |
| F667 | objectDefinitionID | fineline | P_D87 | entity | name | Postpaid Verizon |
|  | userKey | 667 | C_10 | fineline | carrier | Verizon Wireless |
| F662 | objectDefinitionID | fineline | P_D87 | entity | name | Postpaid AT&T |
|  | userKey | 662 | C_10 | fineline | carrier | AT&T |

FIG. 3A

| Row Key 410 | Info 412 | | Relation 414 | Classification 416 | Attributes 418 | |
|---|---|---|---|---|---|---|
| 10 | objectDefinitionID | product | P_S1 | entity | name | iPhone |
| | | | C_101 | product | energyStarCert | Yes |
| | | | C_102 | electronics | warranty | warrantyid |
| | | | | mobilephone | voltage | 120 |
| | | | | smartphone | screenSize | 3.5 |
| | | | | retailproduct | talkTime | 8 |
| | | | | onlineproduct | | |
| 101 | objectDefinitionID | offering | P_10 | entity | name | Black iPhone 4 Verizon 8GB |
| | | | P_F667 | product | color | Black |
| | | | C_ABC1 | mobilephone | carrier | Verizon Wireless |
| | | | C_ABC2 | smartphone | | |
| | | | | retailproduct | | |
| 102 | objectDefinitionID | offering | P_2 | entity | name | Black iPhone 4 Sprint 8GB |
| | | | P_F665 | product | color | Black |
| | | | | mobilephone | carrier | Sprint |
| | | | | smartphone | | |
| | | | | retailproduct | | |

FIG. 3B

| Row Key 410 | Info 412 | | Relation 414 | Classification 416 | Attributes 418 | |
|---|---|---|---|---|---|---|
| ABC1 | objectDefinitionID | gtin | P_101 | entity | name | IPH4 BLK 8G |
| | userKey | 8850185 | P_XYZ1 | tradeitem | gln | 100001 |
| | | | C_DEF1 | | netContent | 1 |
| | | | | | descriptiveSize | LARGE |
| ABC2 | objectDefinitionID | gtin | P_101 | entity | name | IPH4 8GB |
| | userKey | 6055662 | P_XYZ1 | tradeitem | gln | 100002 |
| | | | C_DEF2 | | netContent | 1 |
| | | | | | descriptiveSize | Large |
| DEF1 | objectDefinitionID | supplyitem | P_ABC1 | entity | item1Desc | IPHONE 4 BLK 8GB VZW |
| | userKey | 550064907 | | supplyitem | vendorNbr | 20000 |
| | | | | | vnpkQty | 24 |
| | | | | | upcNbr | 123 |
| DEF2 | objectDefinitionID | supplyitem | P_ABC2 | entity | item1Desc | SPRINT IPHONE 4 8GB |
| | userKey | 550150517 | | supplyitem | vendorNbr | 30000 |
| | | | | | vnpkQty | 24 |
| | | | | | upcNbr | 432 |
| DEF3 | objectDefinitionID | supplyitem | P_ABC3 | entity | item1Desc | IPHN4 8GB BLC SPRINT |
| | userKey | 5500080945 | | supplyitem | vendorNbr | 20000 |
| | | | | | vnpkQty | 24 |
| | | | | | upcNbr | 1234 |

FIG. 3C

| # | Row Key 410 | Relation 414 | Attributes 418 | |
|---|---|---|---|---|
| (1) | LMN | | name | Men's Red Polo |
| | | | releaseDate | 2010-07-02 |
| | | | RetailPrice | 20.00 |
| (2) | LMN _segment=warehouse | P_LMN | name | Red Polo Shirt |
| (3) | LMN _market=US | P_LMN | releaseDate | 2010-07-02 |
| (4) | LMN _market=CA | P_LMN | releaseDate | 2010-07-15 |
| (5) | LMN _market=UK | P_LMN | releaseDate | 2010-09-20 |
| (6) | LMN _store=2195 | P_LMN | retailPrice | 19.97 |
| (7) | LMN _store=5521 | P_LMN | retailPrice | 18.97 |
| (8) | OPQ | | description | Noisemaker |
| (9) | OPQ _date={2012-12-15,2013-01-01} | P_OPQ | description | New Year's Noisemaker |
| (10) | OPQ _date={2012-06-20,2012-07-04},market=US | P_OPQ | description | Independence Day Noisemaker |
| (11) | OPQ _date={2012-05-01,2012-05-05} | P_OPQ | description | Cinco de Mayo Noisemaker |

FIG. 4

SYSTEMS AND METHODS FOR DYNAMIC HIERARCHICAL METADATA STORAGE AND RETRIEVAL

RELATED APPLICATION

The present application claims the benefit of U.S. Provisional Application No. 62/580,187 filed Nov. 1, 2017, which is hereby incorporated herein in its entirety by reference.

TECHNICAL FIELD

Embodiments of the present disclosure relate generally to the field of data storage, and more particularly to data storage solutions for managing dynamic metadata.

BACKGROUND

Metadata is data that describes and gives information about other data. In the data storage context, metadata often describes the attributes that are applicable to, or available for, certain objects. Many database systems support formal metadata definition languages, such as structured query language (SQL) or other data definition languages (DDLs). Database level metadata updates can be risky, however, if appropriate controls are not enforced, and slow to propagate.

Business processes often require information storage systems that can retrieve, process, enter, and modify various attributes for a variety of types of objects. In order for information storage systems to process new types of information, it is often necessary to add code to the system to enable that processing. Relational database management systems (RDBMSs) can enforce data consistency and integrity through the structure of physical database schemas. This can enable some automatic code generation and modification.

RDBMSs have drawbacks that can make it difficult for them to perform effectively in large and complex data storage environments where big data support is desired. For example, RDBMSs can be too slow and too inflexible to support real-time and near real-time performance requirements of Internet or other product applications. Various key-value, tuple, object-oriented, and wide-column data stores can be better optimized to run in distributed or clustered environments at the price of strong integrity checking within the database system itself. Data management is therefore often relegated to higher level middleware, or user interface code, such that the addition of a new product attribute might require software developers to modify user interface, middleware, and database layers of a system to handle it appropriately. This can be especially problematic in large retail organizations, where information regarding products, suppliers, package quantities, and compliance must be tracked and managed, and many attribute changes are expected.

What is needed in the industry, therefore, are systems and methods for managing and propagating dynamic attribute updates.

SUMMARY

Embodiments of the present disclosure provide a data storage platform comprising systems and methods for attribute management related to a key-attribute-value data store. The data storage system can dynamically expand a data store's capacity to process new information, and therefore significantly reduce the total cost of ownership of the system, the time taken to implement new functionality, and the traditional dependence on information technology resources to enable the system to process new types of information.

In embodiments, a data storage system can comprise an attribute repository, object definition repository, object repository, an attribute retrieval interface, and an attribute value repository.

The attribute repository can store a plurality of classifications, and each classification can comprise one or more attributes. The object definition repository can store a plurality of object definitions. Each object definition can be associated with one or more classifications. The object repository can store a plurality of objects. Each object can be associated with an object definition.

The attribute retrieval interface can be configured to provide a set of valid, relevant, or available attributes for a given classification, object definition, or object. The attribute-value repository can store a plurality of values, which are each associated with an object, and an attribute that is within the set of available attributes for the object. Retrieval and update of values for an object can be performed within the attribute value repository.

In embodiments, hierarchical relationships can exist between classifications, object definitions, and/or objects. The attribute repository can comprise one or more classification relationships, each classification relationship associating a child classification with a parent classification. The object definition repository can comprise one or more object definition relationships, each object definition relationship associating a child object definition with a parent object definition. The object repository can comprise one or more object relationships, each object relationship associating a child object with a parent object.

In embodiments, the attribute retrieval interface can use the relationship to provide the set of available attributes. For example, the attribute retrieval interface can be further configured to include the set of available attributes for a parent classification associated with a classification in the set of available attributes for the classification. The attribute retrieval interface can be further configured to include the set of available attributes for a parent object definition associated with an object definition in the set of available attributes for the object definition. The attribute retrieval interface can be further configured to include the set of available attributes for a parent object associated with an object in the set of available attributes for the object.

In embodiments, the data storage system can include a dynamic form builder. The dynamic form builder can be configured to create or modify an object by receiving an object definition (or identification), generating one or more user interface elements enabling a user to input a data value corresponding to each available attribute of the set of available attributes for the object definition, storing an object in the object repository corresponding to the object definition, and storing the input data values corresponding to each available attribute associated with the object in the attribute value repository.

In embodiments, the dynamic form builder can also be configured to create one or more child objects for an object by retrieving one or more child object definitions for the object, each child object definition having the object definition for the object as an associated parent definition, generating one or more user interface elements enabling the user to select one of the one or more child object definitions, and creating a new object based on the selected child object definition.

In embodiments, the data storage system can be configured for use as a product information system. For example, at least one of the plurality of object definitions can be an item definition, and at least one of the plurality of object definitions can be trade item definition. At least one of the one or more object definition relationships can associate the item definition with the trade item definition such that the item definition is the parent definition of the trade item definition, and the trade item definition can be associated with a classification having a package type attribute and a package quantity attribute.

In addition, at least one of the plurality of object definitions can be a supply item definition, and at least one of the one or more object definition relationships can associate the item definition with the supply item definition such that the item definition is the parent definition of the supply item definition, and the supply item definition can be associated with a classification having a supplier attribute and a store identification attribute.

In embodiments, each attribute can comprise one or more constraints, each having a constraint type that can be selected from the group including: valid value constraints, minimum value constraints, maximum value constraints, and user-defined expression constraints. In embodiments, a data validator can be configured to verify that a value is compliant with the constraints for the associated attribute.

In embodiments, each of the plurality of values can have a composite key comprising data elements identifying the associated object and the parent object of the associated object. In embodiments, where the attribute value repository comprises a plurality of data storage systems, values can be partitioned based on the composite key of each of the plurality of values.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

FIG. 3A is a partial data table representing example data within an object repository, according to an embodiment.

FIG. 3B is a continuation of the data table of FIG. 3A.

FIG. 3C is a continuation of the data tables of FIG. 3A and FIG. 3B.

FIG. 4 is a data table representing example data within an object repository, according to an embodiment.

Figure 1:
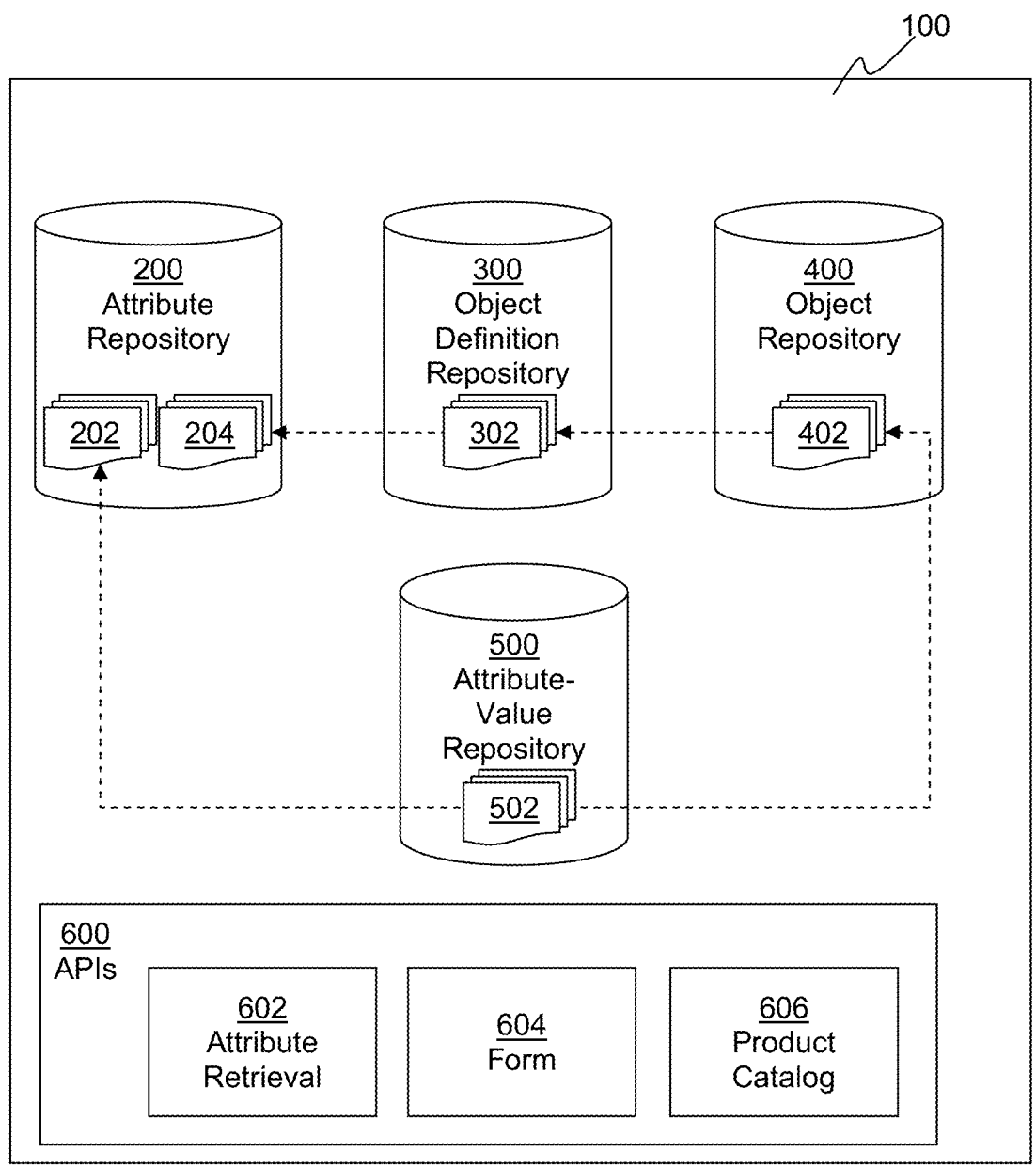
FIG. 1 is a block diagram depicting a data storage system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Embodiments relate to systems and methods for dynamic hierarchical metadata storage and retrieval. FIG. 1 is a block diagram depicting components of a data storage system 100, according to an embodiment. System 100 can enable storage of attribute values related to entities or objects in an entity-attribute-value (EAV) data model. An EAV data model can enable the encoding of object attributes in a space-efficient manner. EAV data models can be particularly useful where the number of attributes, properties, or parameters that can be used to describe an object is very large, but the number of attributes that will actually apply to any given object is relatively small. Those of ordinary skill in the art will appreciate that EAV data models are also known as object-attribute-value data models, vertical database models, and open schemas.

System 100 can comprise a number of repositories, which can be stored in one or more data storage systems. The repositories of system 100 can reside within one or more database systems such as MySQL, Postgres, and Cassandra, or reside within files on a single computing system, or across multiple computing systems in a distributed computing system, such as a Hadoop distributed file system. The repositories of system 100 can reside in combinations of database and file storage systems in embodiments. As discussed with references to FIGS. 2A-2C below, the various repositories can be represented by logical models comprising one or more entities which each include a plurality of fields, at least one of the fields being a key field. Each entity described can have a physical implementation in a database table, spreadsheet, text file, or any other file format.

Figure 2A:
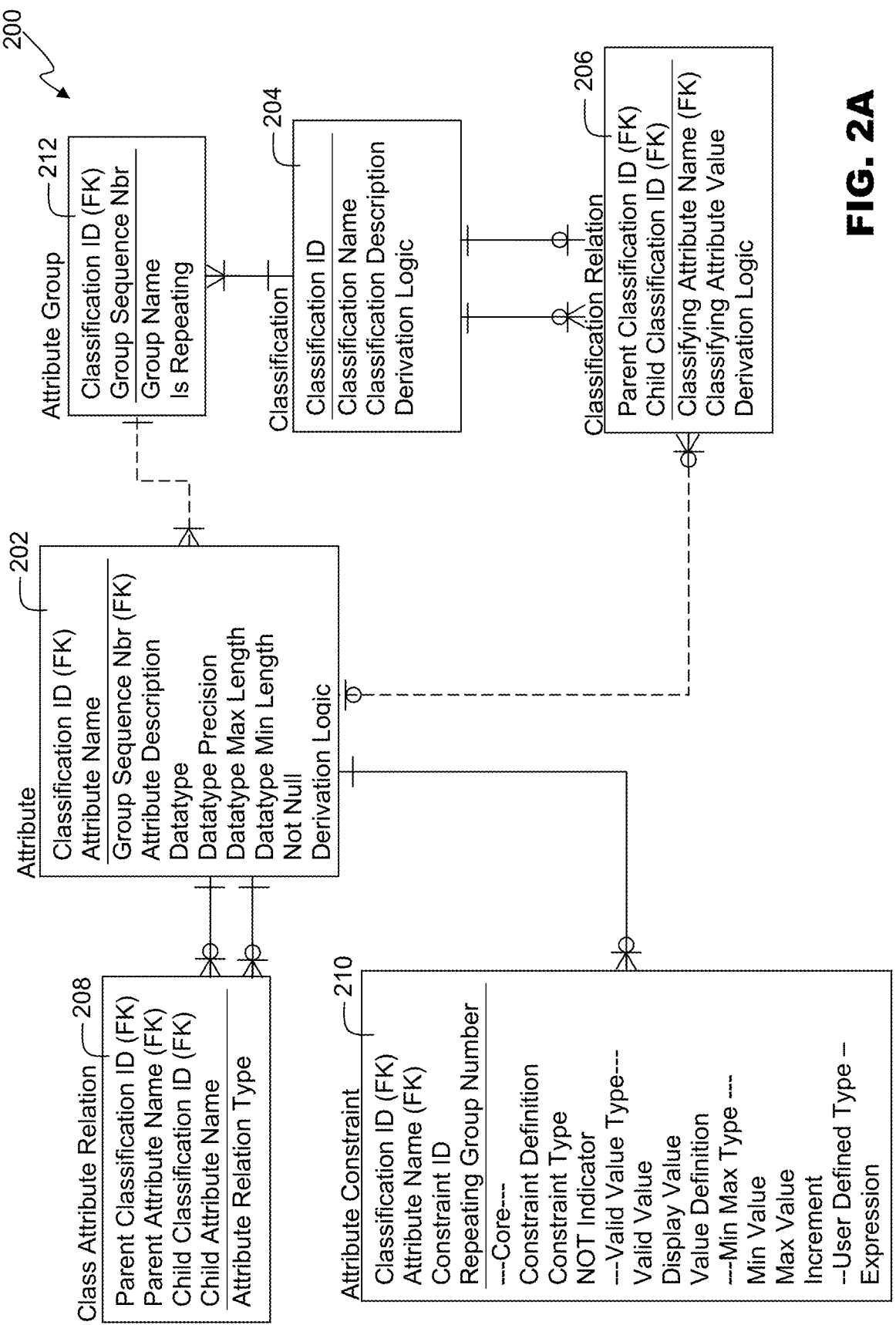
FIG. 2A is a block diagram depicting a logical model of an attribute repository, according to an embodiment.

System 100 can comprise an attribute repository 200. Attribute repository 200 can store attributes 202, which can each be associated or linked with a classification 204. FIG. 2A is a block diagram depicting a logical model of an attribute repository 200, according to an embodiment. The key fields of an attribute 202 entity can include:

| Field Name | Foreign Key Source |
| --- | --- |
| Classification ID | Classification 204 |
| Attribute Name | — |

Additional fields of an attribute 202 entity can include:

| Field Name | Foreign Key Source |
| --- | --- |
| Group Sequence Nbr | Attribute Group 212 |
| Attribute Description | — |
| Datatype | — |
| Datatype Precision | — |
| Datatype Max Length | — |
| Datatype Min Length | — |
| Not Null | — |
| Derivation Logic | — |

The relationship between attributes 202 and classifications 204 can be many to one, such that each attribute 202 can be associated with a single classification 204. In embodiments, attributes 202 can be linked into attribute groups 212 (discussed below).

The derivation logic field can enable the system to create new attribute values based on other related attribute values. For example, an "Item Margin" attribute can have a derivation logic value that is derived by subtracting an "Item Cost" from an "Item Retail Price". In embodiments, the derivation logic field can comprise executable code, pseudocode, or other interpretable instructions enabling derivation of the field's value. Derived values can be pre-calculated, or calculated at runtime, in embodiments.

The key fields of a classification 204 entity can include:

| Field Name | Foreign Key Source |
| --- | --- |
| Classification ID | — |

Additional fields of a classification 204 entity can include:

| Field Name | Foreign Key Source |
| --- | --- |
| Classification Name | — |
| Classification Description | — |
| Derivation Logic | — |

In embodiments, attribute repository 200 can further comprise relationship entities. A classification relationship 206 entity can link a parent classification 204 to a child classification 204. In embodiments, each classification 204 can have zero or one parent, and zero or many children. The key fields of a classification relationship 206 entity can include:

| Field Name | Foreign Key Source |
| --- | --- |
| Parent Classification ID | Classification 204 |
| Child Classification ID | Classification 204 |

Additional fields of a classification relationship 206 entity can include:

| Field Name | Foreign Key Source |
| --- | --- |
| Classifying Attribute Name | Attribute 202 |
| Classifying Attribute Value | — |

Classifying attributes can be used to determine which particular rules, actions, or values should be applied to an object. As an example, an attribute named "ISBN" could be used to assign items with a populated ISBN attribute value to a classification group named "Books." As another example, items that have an attribute value of "true" for an attribute named "Contains Fertilizer?" can be flagged for the initiation of special hazardous material handling processes in shipment or receiving. In embodiments, such classifications can be performed automatically based on the classifying attribute value.

An attribute relationship 208 entity can link a parent attribute 202 with a child attribute 202. In embodiments, each classification 204 can have zero or one parent, and zero or many children. The key fields of an attribute relationship 208 entity can include:

| Field Name | Foreign Key Source |
| --- | --- |
| Parent Classification ID | Attribute 202 |
| Parent Attribute Name | Attribute 202 |
| Child Classification ID | Attribute 202 |
| Child Attribute Name | Attribute 202 |

Additional fields of an attribute relationship 208 entity can include:

| Field Name | Foreign Key Source |
| --- | --- |
| Attribute Relation Type | — |

The Attribute Relation Type field can be used to define the type or nature of the relationship between entities. For example, a "Case-Each" relationship can relate a product to the Case package level that contains that product.

In embodiments, attribute repository 200 can comprise attribute constraint 210 entities. Attribute constraints 210 can be used to ensure that values 502 stored within attribute-value repository 500 are valid. Each attribute constraint 210 can be associated with one or more attributes 202, though each attribute 202 may or may not have any constraints 210. Each attribute constraint can have a type. Constraint types can include valid value constraints, min/max value constraints, and user-defined constraints that can include an expression that is interpretable by a validator, such as validator 708 (discussed below). The key fields of an attribute constraint 210 entity can include:

| Field Name | Foreign Key Source |
| --- | --- |
| Classification ID | Attribute 202 |
| Attribute Name | Attribute 202 |
| Constraint ID | — |
| Repeating Group Number | — |

The repeating group number field can enable multiple unique values to be assigned for an attribute classification constraint. For example, there may be multiple valid values for a given attribute, and therefore multiple attribute constraint 210 entities with the same classification ID, attribute name, and constraint ID may exist. The repeating group number field can differentiate between each possible valid value in such cases.

The additional fields of an attribute constraint 210 entity can vary based on the constraint type. Core fields that can be used with all constraint types can include:

| Field Name |
| --- |
| Constraint Definition |
| Constraint Type |
| NOT Indicator |

Fields that can be used with valid value constraint types can include:

| Field Name |
| --- |
| Valid Value |
| Display Value |
| Value Definition |

Fields that can be used with min/max constraint types can include:

| Field Name |
| --- |
| Minimum Value |
| Maximum Value |
| Increment |

Fields that can be used with user-defined constraint types can include:

| Field Name |
| --- |
| Expression |

In embodiments, attributes 202 can be associated with groups 212, instead of, or as well as, being directly associated with classifications 204. Attribute groups 212 can enable the definition of an order for the attributes 202 of a classification 204. For example, it may be desirable to always display the make, model, and year attributes of a car in that order. Attribute groups 212 can also enable a classification to have multiple versions of a given named attribute, each with different constraints 210. For example, consider a "beverage" classification having an associated "size" attribute and "package type" attribute. The maximum size constraint for the "size" attribute might be different for objects with a "bottle" package type attribute versus a "can" package type attribute. This business rule can be represented as a single classification 204 (beverage), and a single attribute name (size). Multiple attributes 202 will share the "beverage" classification and "size" name but will have different group sequence numbers.

Figure 2B:
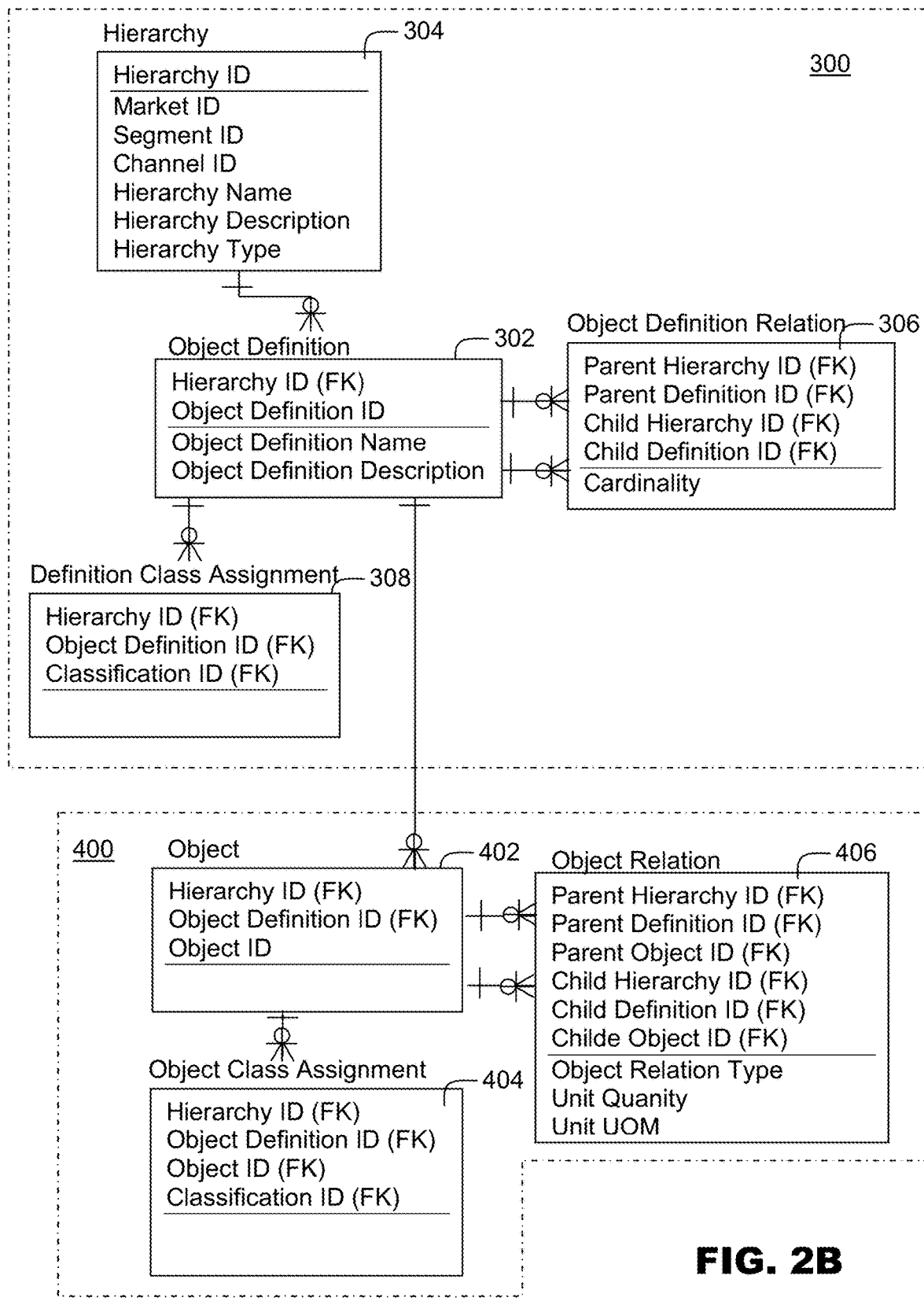
FIG. 2B is a block diagram depicting a logical model of an object definition repository and an object repository, according to an embodiment.

Returning to FIG. 1, object definition repository 300 can comprise a plurality of object definitions 302 (or hierarchy nodes), and each object definition 302 can be associated with one or more classifications 204. Object repository 400 can comprise a plurality of objects 402 (or object instances). Each object 402 can be associated with an object definition 302. FIG. 2B is a block diagram depicting a logical model of an object definition repository 300 and object repository 400 according to an embodiment.

As depicted in FIG. 2B, each object definition 302 can be a node within a hierarchy 304. Hierarchies 304 can enable more efficient partitioning of system 100, because the object definitions 302, objects 402, and attribute values 502 (discussed below) can be grouped by business unit, geography, or other criteria. This grouping can enable the associated data to be physically and logically separated from each other if no data sharing needs to occur. In embodiments, hierarchies 304 can represent an organizational structure through individual object definitions 302, and the relationships 306 between them. In some embodiments, however, it can be more efficient from a data storage perspective to include additional organization level fields within each hierarchy 304 entity itself. For example, identifiers for the market, segment, and channel that the hierarchy 304 belongs to can be used. Hierarchies 304 can therefore comprise business rule-specific fields such as Market ID, Segment ID, and Channel ID. The key fields of a hierarchy 304 entity can include:

| Field Name |
| --- |
| Hierarchy ID |

Additional fields of a hierarchy 304 entity can include:

| Field Name |
| --- |
| Market ID |
| Segment ID |
| Channel ID |
| Hierarchy Name |
| Hierarchy Description |
| Hierarchy Type |

Each object definition 302 can be represented by an object definition entity. The key fields of an object definition 302 entity can include:

| Field Name | Foreign Key Source |
| --- | --- |
| Hierarchy ID | Hierarchy 304 |
| Object Definition ID | — |

Additional fields of an object definition 302 entity can include:

| Field Name |
| --- |
| Object Definition Name |
| Object Definition Description |

Each object definition 302 can be assigned one or more classifications 204 via a definition class assignment 308 entity.

The key fields of a definition class assignment 308 entity can include:

| Field Name | Foreign Key Source |
|---|---|
| Hierarchy ID | Hierarchy 304 |
| Object Definition ID | Object Definition 302 |
| Classification ID | Classification 204 |

In embodiments, object definition repository 300 can further comprise relationship entities. An object definition relationship 306 entity can link a parent object definition 302 to a child object definition 302. In embodiments, each object definition 302 can have zero or one parent, and zero or many children, which can be specified by a cardinality field. The key fields of an object definition relationship 306 entity can include:

| Field Name | Foreign Key Source |
|---|---|
| Parent Hierarchy ID | Object Definition 302 |
| Parent Definition ID | Object Definition 302 |
| Child Hierarchy ID | Object Definition 302 |
| Child Definition ID | Object Definition 302 |

Additional fields of an object definition relationship 306 entity can include:

| Field Name |
|---|
| Cardinality |

Object repository 400 comprises a plurality of objects 402. Each object 402 can be an instance of an object definition 302. The key fields of an object 402 entity can include:

| Field Name | Foreign Key Source |
|---|---|
| Hierarchy ID | Object Definition 302 |
| Object Definition ID | Object Definition 302 |
| Object ID | — |

Each object 402 can be assigned one or more classifications 204 via an object class assignment 404.

The key fields of an object class assignment 404 entity can include:

| Field Name | Foreign Key Source |
|---|---|
| Hierarchy ID | Object 402 |
| Object Definition ID | Object 402 |
| Object ID | Object 402 |
| Classification ID | Classification 204 |

In embodiments, object repository 400 can further comprise relationship entities. An object relationship 406 entity can link a parent object 402 to a child object 402. In embodiments, each object 402 can have zero or one parent, and zero or many children. Object relationships can comprise an object relation type, a unit quantity, and a unit of measure (UOM) for individual units. The key fields of an object relationship 406 entity can include:

| Field Name | Foreign Key Source |
|---|---|
| Parent Hierarchy ID | Object 402 |
| Parent Definition ID | Object 402 |
| Child Hierarchy ID | Object 402 |
| Child Definition ID | Object 402 |

Additional fields of a object relationship 406 entity can include:

| Field Name |
|---|
| Cardinality |

Figure 2C:
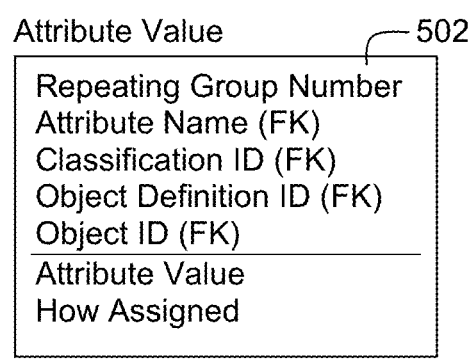
FIG. 2C is a block diagram depicting a logical model of an attribute value repository, according to an embodiment.

Returning to FIG. 1, attribute value repository 500 can comprise a plurality of values 502 that are each associated with one object 402 and one attribute 202. Attribute value repository 500 can enable efficient access to value data. This is beneficial because a common use case can involve retrieving an object 402 and its associated values 502 independently of any available attributes that are not in use. FIG. 2C is a block diagram depicting a logical model of an attribute value repository 500, in context with object 402 and attribute 202 entities.

Attribute value repository 500 can comprise an attribute value 502 entity. In embodiments, each attribute value 502 can be associated with one object 402 and one attribute 202. In embodiments, an attribute value 502 entity can comprise a repeating group number. Each attribute value 502 entity can comprise the actual value of the attribute, and an indication of how the attribute was assigned. For example, attributes can be assigned based on inheritance from parent objects, default values, user input, or derivation from other values. The key fields of an attribute value 502 entity can include:

| Field Name | Foreign Key Source |
|---|---|
| Repeating Group Number | |
| Attribute Name | Attribute 202 |
| Classification ID | Attribute 202 |
| Object Definition ID | Object 502 |
| Object ID | Object 502 |

Additional fields of an attribute value 502 entity can include:

| Field Name |
|---|
| Attribute Value |
| How Assigned |

In embodiments, repositories 200, 300, 400 and 500 can have more or fewer entities than those depicted and discussed. For example, while attributes 202 are depicted and described as linked to object definitions 302 and objects 402 via classifications 204, in embodiments, separate classifications 204 can be eliminated (for example, by linking an attribute group directly to objects 402 and object definitions 302), or all attributes and objects can share a single classification 204. In addition, each entity can include more, fewer, or alternate fields than those discussed above. Those of ordinary skill in the art will also recognize that the logical models presented in FIGS. 2A-2C are partially normalized, and in embodiments the normalization can be increased or decreased in order to meet performance and complexity goals.

In an embodiment, a physical implementation of data storage system 100 can comprise an object repository 400, comprising column families that include the various entities and fields of attribute repository 200, object definition repository 300, and attribute value repository 500. FIGS. 3A-3C are segments of a table depicting example data elements in an embodiment of object repository 400. The depicted object repository 400 comprises a row key 410 column, and column families for information 412, relationships 414, classifications 416, and attributes 418.

The information column family 412 can comprise definition information for the object such as an identifier for the object definition 402. A user key field can assign a globally unique (or locally unique) key value to the object. In embodiments, an index can be created on the user key field in order to enable faster lookups. The information column family 412 can also comprise fields for storing accounting information such as a creation timestamp and a creation user ID.

The relationship column family 414 can comprise pointers to other parent and child records. It can also store attributes for the parent/child relationships. Both relationships between object definitions 402 and between objects 402 themselves can be provided. In embodiments, the relationship column family 414 can be encoded as follows: <rel-type>_<collection-id>[_attribute]=[value], where valid rel-type are: P=Parent, C=Child. This encoding can enable range slices to provide fast scans of specific relationship types. For example, searches can be performed as "P_*" or "C_*".

The classifications column family 416 can provide an ordered or unordered list of the classifications 204 that apply to the object 502. The attributes column family 418 can comprise the attributes 202 and attributes values 502 for the object 402.

In embodiments, row keys 410 can be composite. As depicted in the example of FIGS. 3A-3C, composite row keys 410 can be encoded to include an indicator of the object definition 402. For example, the fineline objects have an "F" prepended to the row key: F665, F667, F662. This can enable grouping by the type, or definition of objects 402.

Composite row keys 410 can also enable retrieval of context-specific attributes. The name value pairs that make up the context can be encoded and appended to the end of the key. This can enable partitioning of records based on object, such that similar objects can be stored close together in a distributed data store (for example, the same node in a ring), resulting in faster access to all of an object's data. Row keys 410 can be at least partially pseudo-random, which can enable data to be evenly distributed across a cluster.

An example of context-specific row keys 410 is provided in the table of FIG. 4. FIG. 4 depicts a truncated physical representation of an object repository 400, in which only the row key 410, relationship column family 414 and attributes column family 418 are provided, and row numbers are provided in brackets ( ) for reference purposes. Row (1) comprises default values for a product offering object, LMN. Rows (2)-(7) comprise context-specific override values based on, for example, the segment (2), market (3)-(5), and the store number (6)-(7) for specific offerings of that product. Similarly, rows (9)-(11) provide date and market-specific overrides of the description attribute for a noisemaker, OPQ.

Returning to FIG. 1, data storage system 100 can further comprise a number of application programming interfaces, or APIs 600, that can be in data communication with repositories 200, 300, 400, and 500. APIs 600 can enable human or programmatic users to interface with the data stores to receive and modify attribute metadata and values. APIs 600 can comprise libraries, stored procedures, dynamically linked libraries (DLLs), common object model (COM) components, web applications, web services, command-line interfaces, graphical user interfaces, Thrift APIs, REST APIs, or any other interface type enabling interaction with repositories 200, 300, 400, and 500.

Figure 5:
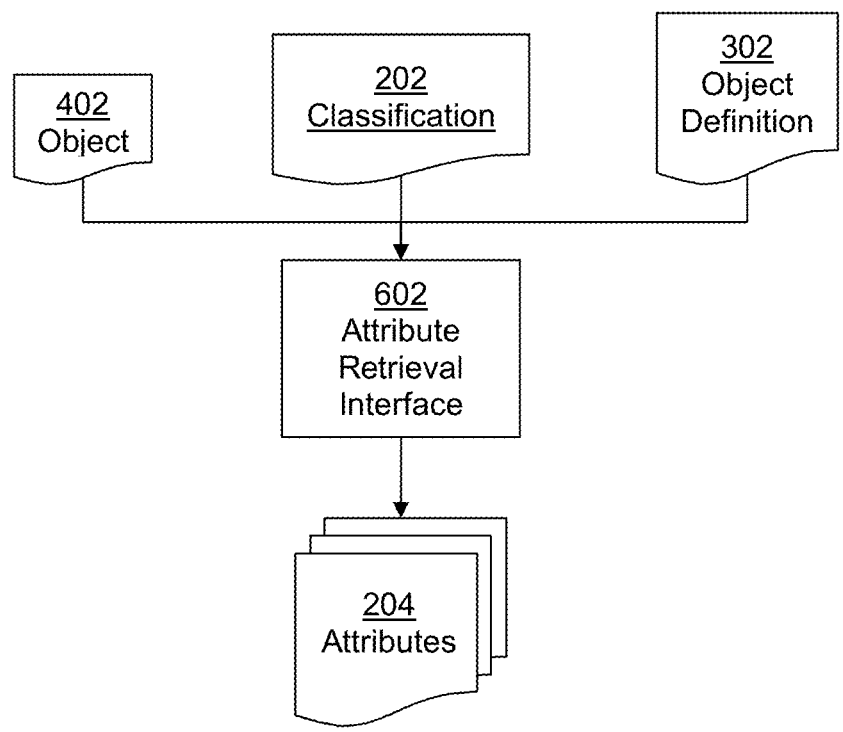
FIG. 5 is a block diagram depicting a schematic view of an attribute retrieval application programming interface, according to an embodiment.

FIG. 5 is a block diagram depicting a schematic view of an attribute retrieval interface 602. Attribute retrieval interface 602 can provide the set of attributes 202 that are applicable for a given classification 204, object definition 302, or object 402, or group thereof.

Figure 6:
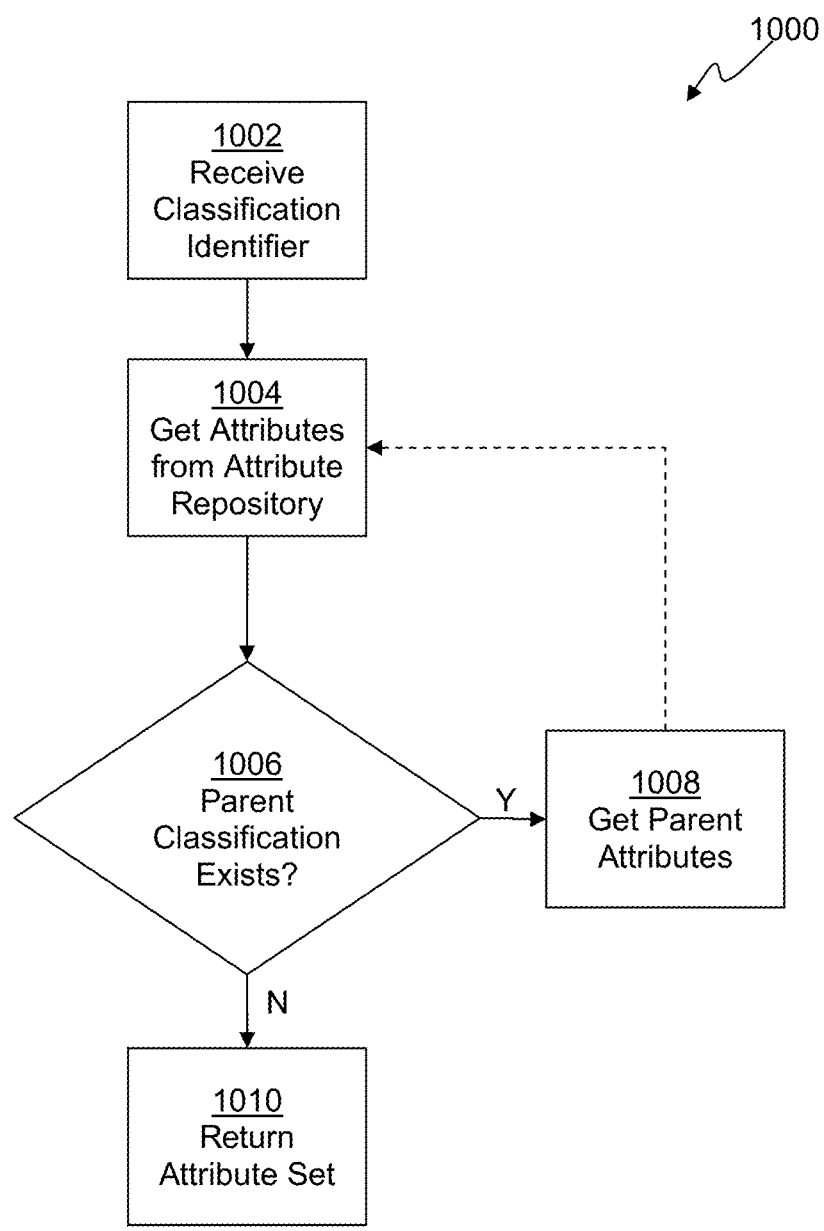
FIG. 6 is a flowchart depicting a method for retrieving attributes, according to an embodiment.

FIG. 6 is a flowchart depicting a method 1000 for retrieving the set of attributes that are associated with a classification 204. At 1002, a classification identifier can be received. In embodiments, the identifier can be one or more key fields of a classification 204. At 1004, the attributes 202 associated with the classification 204 can be retrieved from the attribute repository 200. In embodiments, the attributes 202 can be searched to find all attributes with a matching classification identifier.

At 1006, the classification relationship 206 entities can be searched to determine if the current classification 204 has any parent classifications. If so, at 1008, the attributes for the parent classification can be requested, for example, by looping back to 1004 for each parent classification. After the attributes from the classification 204 and any ancestor classifications have been retrieved, the attribute set can be returned at 1010.

Figure 7:
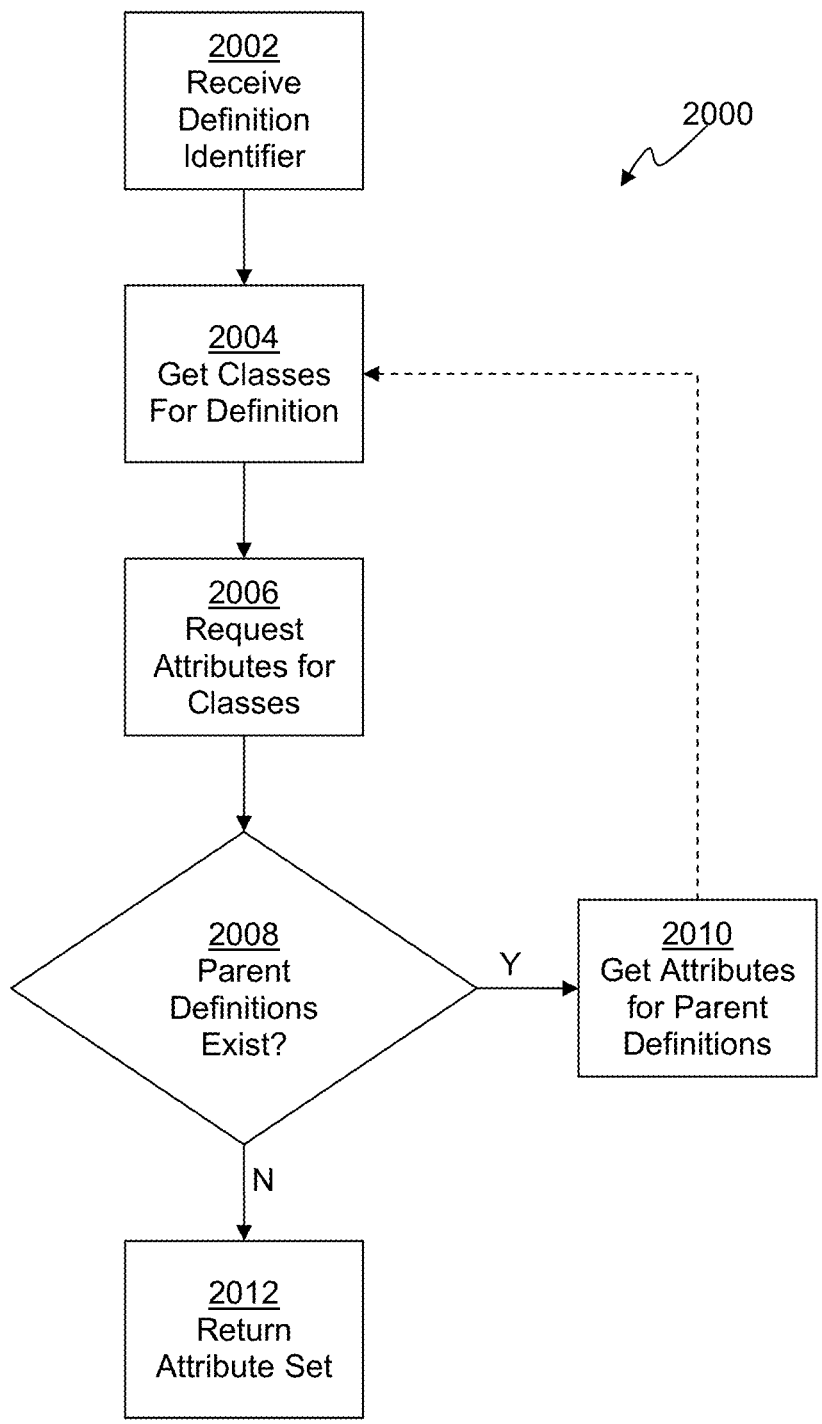
FIG. 7 is a flowchart depicting a method for retrieving attributes, according to an embodiment.

FIG. 7 is a flowchart depicting a method 2000 for retrieving the set of attributes that are associated with an object definition 302. At 2002 an object definition identifier can be received. In embodiments, the identifier can be one or more key fields of an object definition 302. At 2004, the classifications 204 associated with the object definition 302 can be retrieved, for example by searching the definition class assignment 308 entities for records with a matching object definition identifier. At 2006, the attributes associated with each classification 204 can be requested (for example, by executing method 1000).

At 2008, the object definition relation 306 entities can be searched to determine if the object definition 302 has a parent object definition. If so, at 2010, the attributes for the parent object definition can be requested, for example, by looping back to 2004 for each parent object identification. After the attributes for the object definition 302 and any ancestor object definitions have been retrieved, the attribute set can be returned at 2012.

Figure 8:
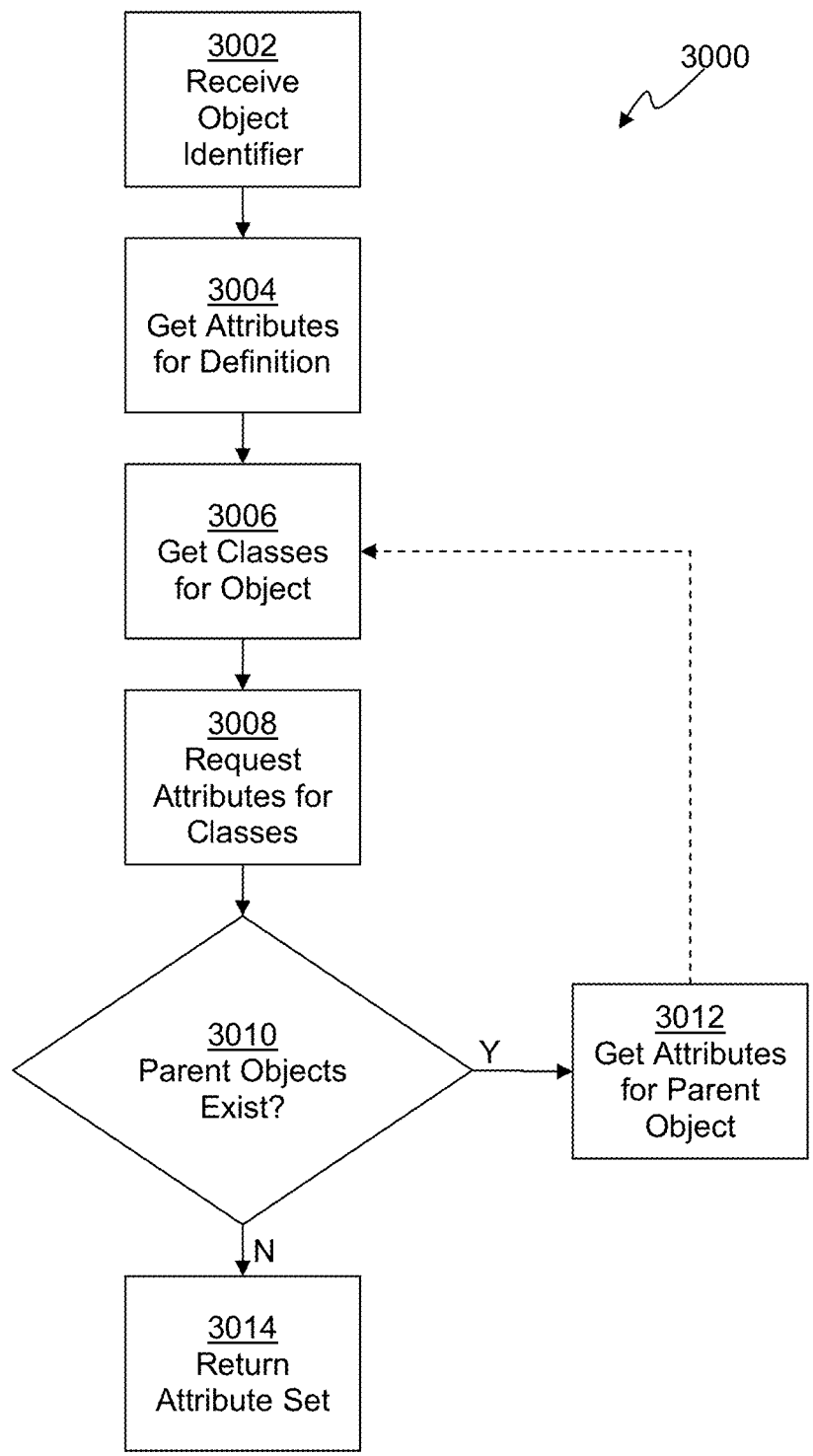
FIG. 8 is a flowchart depicting a method for retrieving attributes, according to an embodiment.

FIG. 8 is a flowchart depicting a method 3000 for retrieving the set of attributes that are associated with an object definition 302. At 3002 an object definition identifier can be received. In embodiments, the identifier can be one or more key fields of an object definition 302. At 3004, the attributes associated with the object definition 302 of the object 402 can be retrieved, for example by executing method 2000. At 3006, the classifications 204 associated with the object 402 can be retrieved, for example by searching the object class assignment 404 entities for records with a matching object identifier. At 3008, the attributes associated with each classification 204 can be requested (for example, by executing method 1000).

At 3010, the object relationship 406 entities can be searched to determine if the object 402 has a parent object. If so, at 3012, the attributes for the parent object definition can be requested, for example, by looping back to 3006 for each parent object. After the attributes for the object 402 and any ancestor objects have been retrieved, the attribute set can be returned at 3014.

Figure 9:
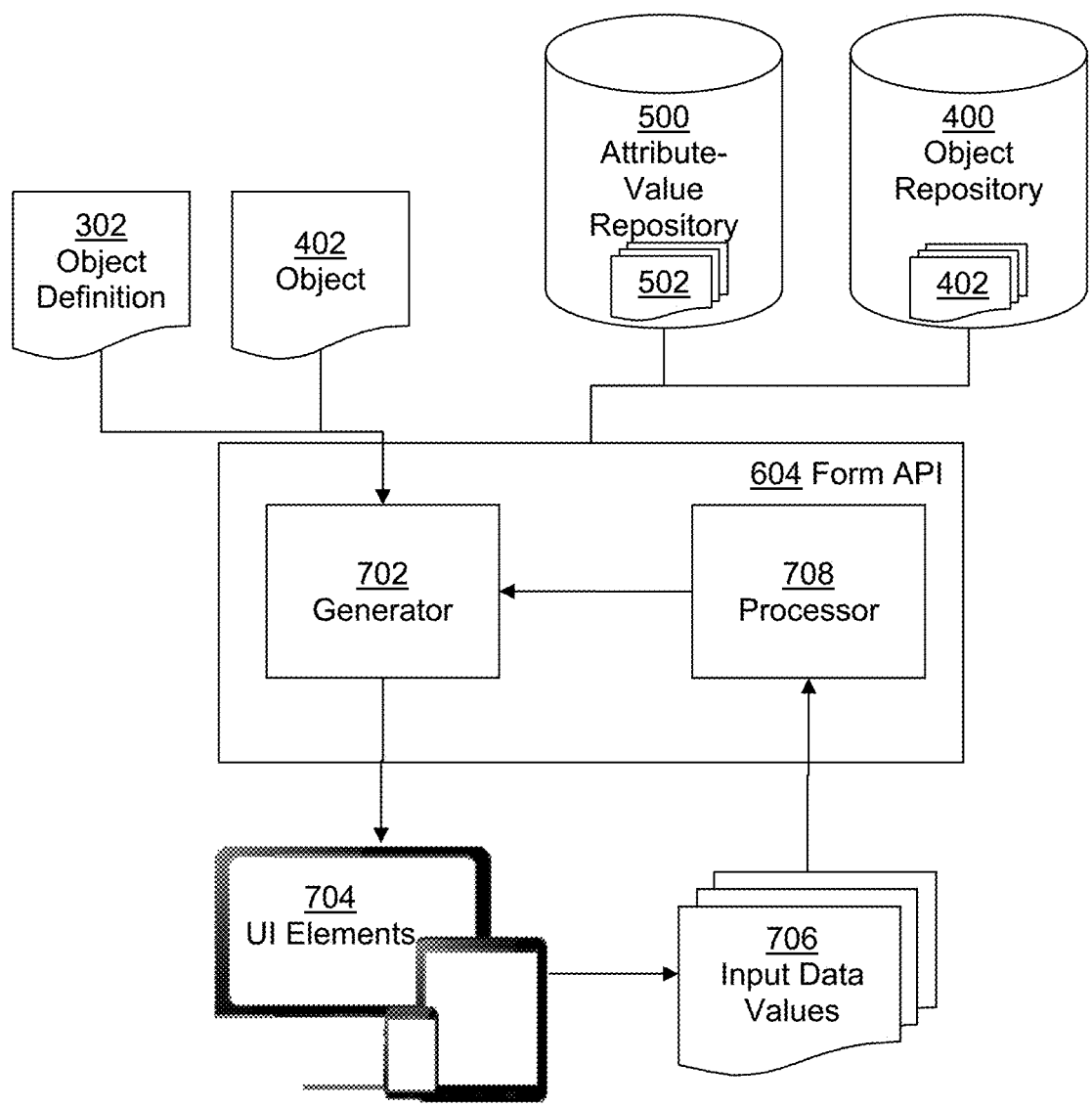
FIG. 9 is a block diagram depicting a schematic view of a form application programming interface, according to an embodiment.

Turning now to FIG. 9, APIs 600 can further comprise form API 604. Form API 604 can provide dynamically generated forms for creation and update of objects 402. Form API 604 can comprise generator 702, which can be configured to generate user interface elements 704 based on an object definition 302 or an already existing object 402.

User interface elements 704 can comprise controls such as text boxes, radio buttons, check boxes, sliders, buttons, text prompts or any other interface elements enabling a user to input data associated with attribute values 502 to be created, updated, stored, or reviewed. User interface elements 704 can be presented on an electronic device such as a computer system, smartphone, or tablet, enabling the user to enter input data values 706.

Processor 708 can receive input data values 706 and validate the data values based on attribute constraints 210. Processor 708 can store attribute values 502 corresponding to the input data values 706, and direct generator 702 to generate additional user interface elements 704 as required.

Figure 10:
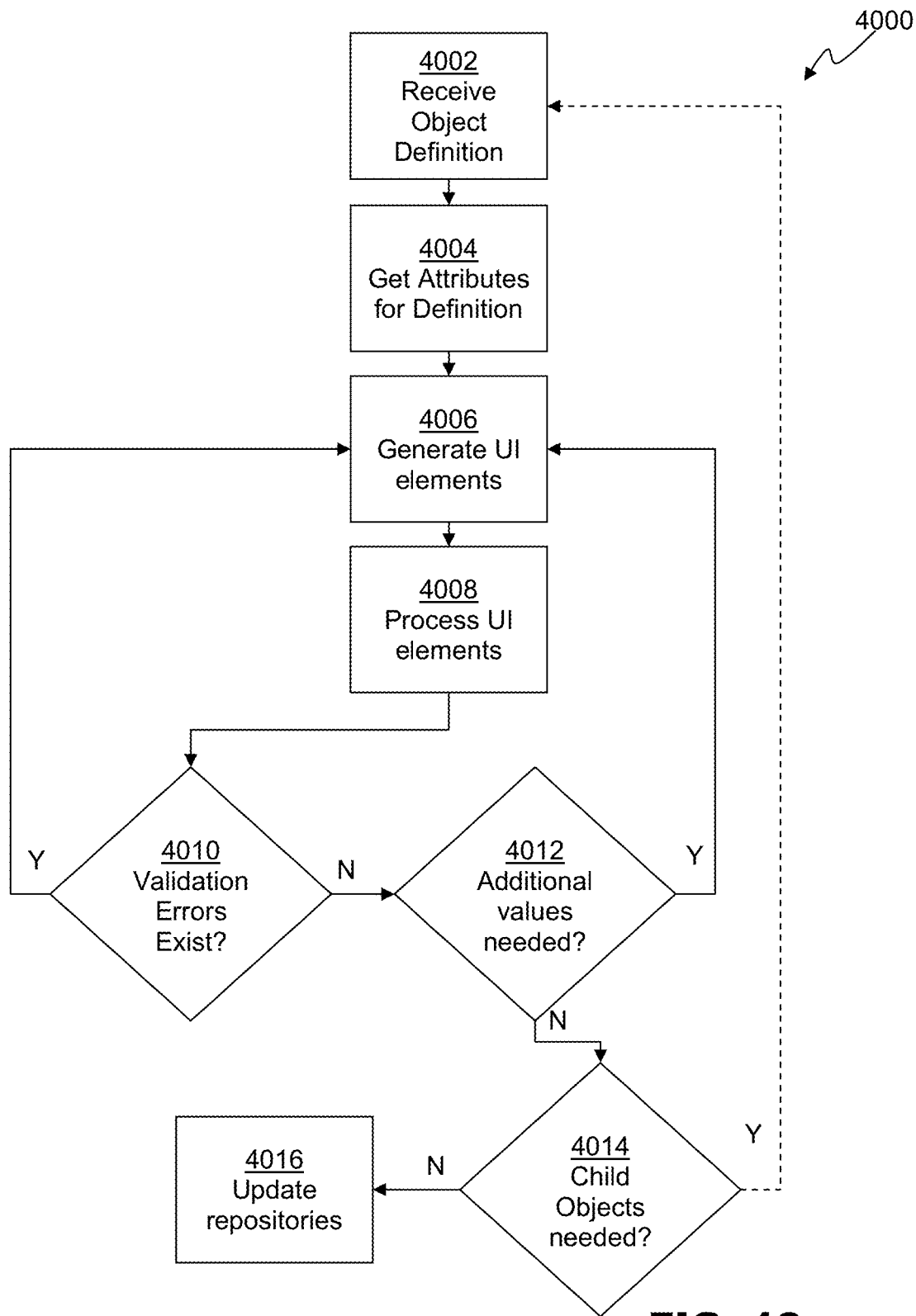
FIG. 10 is a flowchart depicting a method for receiving and storing attribute values, according to an embodiment.

FIG. 10 is a flowchart depicting a method 4000 for dynamic form generation and processing, according to an embodiment. At 4002, an object definition can be received. At 4004, the available attributes 202 for the object definition can be retrieved, for example, by executing method 2000. At 4006, user interface elements 704 can be generated based on the retrieved set of attributes 202. At 4008, the input data values 706 can be processed.

At 4010, the provided values can be validated based on attribute constraints 210 and/or other business rules. If validation errors are detected, user interface elements can be reported to the user and additional input can be requested.

At 4012, the input data values 706 can be processed to determine if additional input data values 706 are required. For example, the classifications associated with the object definition may be context-specific, such that a user selection of certain attribute values will trigger the need for additional attribute values. If so, control can return to 4006 for additional input.

At 4014, the input data values 706 can be processed to determine if any child objects are to be created, and if so, control can loop back to 4002 for each object definition. If not, the object repository 400 can add a new object 402, and the attribute repository 200 can be updated at 4016 with each attribute value 502 provided.

In embodiments, method 4000 can be performed with a preexisting object 402 for modification as input. When user interface elements 704 are generated at 4006, the current values 502 for attributes associated with the preexisting object 402 can be displayed.

Figure 11A:
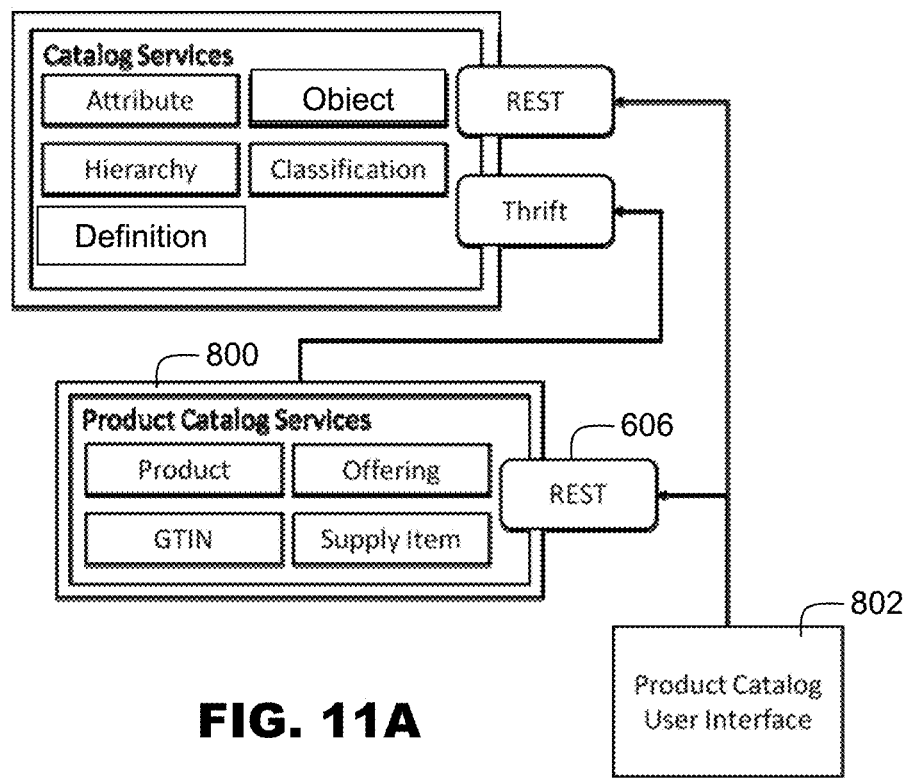
FIG. 11A is a block diagram depicting a schematic view of a product information system, according to an embodiment.
Figure 11B:
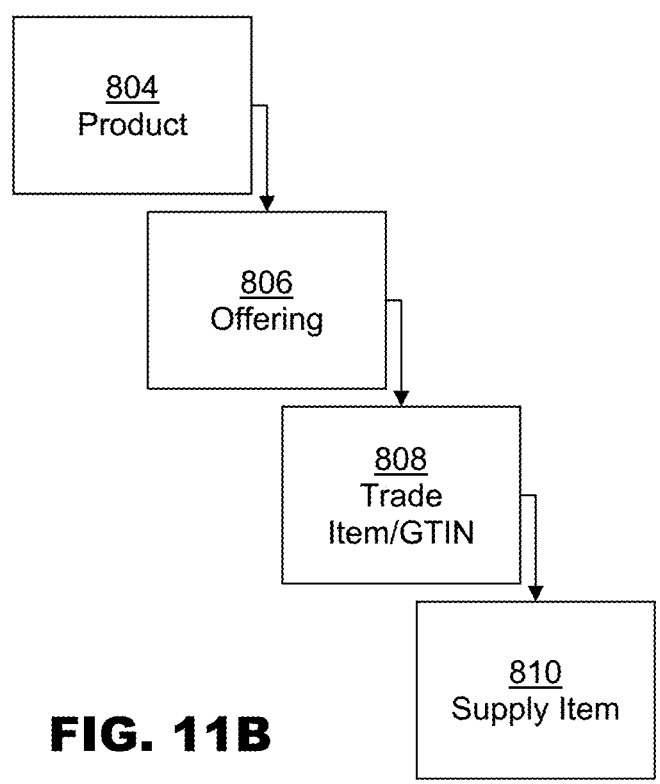
FIG. 11B is a block diagram depicting a product object definition hierarchy, according to an embodiment.
Figure 12:
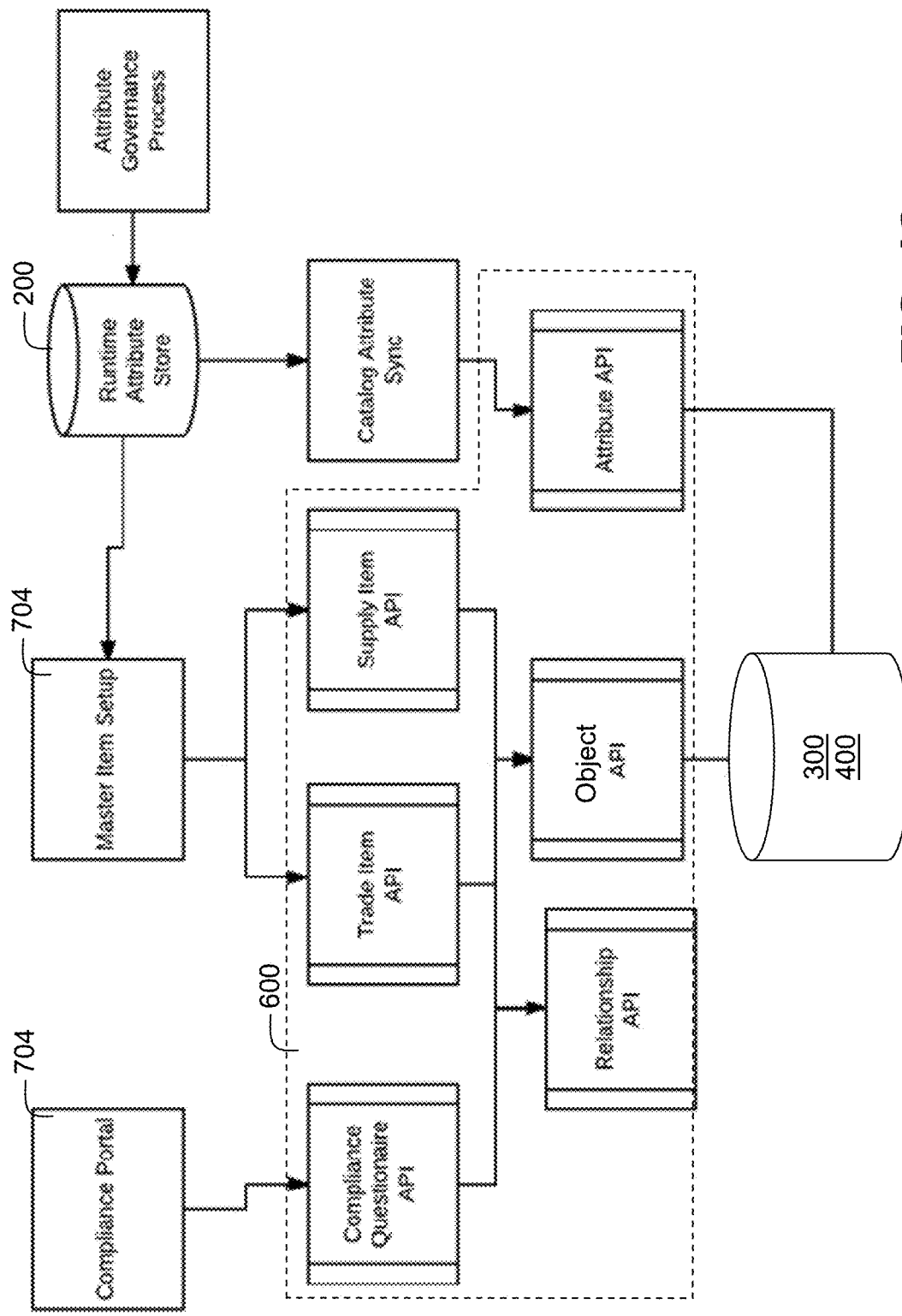
FIG. 12 is a block diagram depicting a schematic view of a product information system, according to an embodiment.

Turning now to FIG. 11A, APIs 600 can further comprise a product catalog API 606, which can enable management of a product catalog 800, including dynamic update of a product catalog user interface 802. This can enable system 100 to be configured for use as a product information system. As can be seen in FIG. 11B, product catalog 800 can comprise a tree of object definitions 302, in which product (or item) object definitions 804 can have child product offering definitions 806. Each product offering definition can have child trade items 808, which can in turn link specific offerings 806 to one or more global trade identification numbers (GTINs). Each trade item 808 can have one or more supply items 810. FIG. 12 is a block diagram depicting an embodiment of system 100, configured to provide product catalog 800.

In embodiments, trade items 808 can comprise a package type attribute (such as unit, case, or pallet), and a package quantity attribute (such as each, 10, or 300). Trade items 808 can further be related to other trade items 808, for example, a trade item representing a pallet of soda can have a child trade item representing a case of soda, and so on.

In embodiments, the product catalog 800 can further comprise a compliance hierarchy that can include object definitions for compliance questionnaires, and questionnaire responses. Compliance forms for supply items 810 can therefore be automatically generated using form API 604.

The dynamic attribute data storage provided by system 100 can enable centralized governance of attributes and object definitions. When a new attribute is discovered or requested, it can flow through a governance process to determine its feasibility. In embodiments, an attribute can be discovered by human interaction, or by a machine learning system. If the attribute is approved, it can be persisted into the attribute repository. A synchronization process can map the new attribute to classifications, object definitions, and objects as required. Because form API 604 dynamically generates user interface elements 704 based on the current attributes 202 for an object definition, content collection for new attributes begins immediately after attributes are created. Attributes can therefore be added "on-the-fly," without the need for application development, modification, or deployment. For example, if a new attribute "Media Type" for a movie product using valid values "UHD," "Blu-ray," "DVD" is requested, it can proceed through the governance process and be approved for item setup use. In near real-time, the attribute can then be made accessible in an Item Setup user interface to collect values on any new media products going forward.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain, or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application-specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A data storage system comprising:
   an attribute repository configured to store digital data comprising a plurality of classifications, each classification comprising one or more attributes;
   an object definition repository configured to store digital data comprising a plurality of object definitions, each object definition associated with one or more of the plurality of classifications;
   an object repository configured to store digital data comprising a plurality of objects, each object associated with one of the plurality of object definitions;
   a computing platform including computing hardware of at least one processor and memory operably coupled to the at least one processor; and
   instructions that, when executed on the computing platform, cause the computing platform to implement:
   an attribute retrieval interface configured to:
   provide a set of available attributes for a classification,
   provide a set of available attributes for an object definition by providing the set of available attributes for each classification associated with the object definition, and
   provide a set of available attributes for an object by providing the set of available attributes for the object definition associated with the object; and an attribute value repository configured to store digital data comprising a plurality of values, each value associated with one of the plurality of objects and one of the attributes in the set of available attributes for the object, whereby each value associated with a selected object can be retrieved or modified within the attribute value repository independently of any available attributes that are not in use.

2. The data storage system of claim 1, wherein:
the attribute repository further comprises one or more classification relationships, each classification relationship associating a child classification with a parent classification;
the object definition repository further comprises one or more object definition relationships, each object definition relationship associating a child object definition with a parent object definition;
the object repository further comprises one or more object relationships, each object relationship associating a child object with a parent object; and
the attribute retrieval interface is further configured to:
include the set of available attributes for a parent classification associated with a classification in the set of available attributes for the classification,
include the set of available attributes for a parent object definition associated with an object definition in the set of available attributes for the object definition, and
include the set of available attributes for a parent object associated with an object in the set of available attributes for the object.

3. The data storage system of claim 2, further comprising a dynamic form builder configured to create a new object by:
receiving an object definition;
generating one or more user interface elements enabling a user to input a data value corresponding to each available attribute of the set of available attributes of the object definition;
storing an object in the object repository corresponding to the object definition; and
storing the input data values corresponding to each available attribute associated with the object in the attribute value repository.

4. The data storage system of claim 3, wherein the dynamic form builder is further configured to create one or more child objects for an object by:
retrieving one or more child object definitions for the object, each child object definition having the object definition for the object as an associated parent definition;
generating one or more user interface elements enabling the user to select one of the one or more child object definitions; and
creating a new object based on the selected child object definition.

5. The data storage system of claim 2, wherein:
at least one of the plurality of object definitions is an item definition;
at least one of the plurality of object definitions is a trade item definition;
at least one of the one or more object definition relationships associates the item definition with the trade item definition such that the item definition is the parent definition of the trade item definition; and
the trade item definition is associated with a classification having a package type attribute and a package quantity attribute.

6. The data storage system of claim 2, wherein:
at least one of the plurality of object definitions is an item definition;
at least one of the plurality of object definitions is a supply item definition;
at least one of the one or more object definition relationships associates the item definition with the supply item definition such that the item definition is the parent definition of the supply item definition; and
the supply item definition is associated with a classification having a supplier attribute and a store identification attribute.

7. The data storage system of claim 1, wherein each attribute comprises one or more constraints each having a constraint type selected from the group consisting of: valid value constraints, minimum value constraints, maximum value constraints, and user-defined expression constraints.

8. The data storage system of claim 7, further comprising a data validator configured to verify that a value is compliant with the constraints for the associated attribute.

9. The data storage system of claim 1, wherein each of the plurality of values comprises a composite key comprising data elements identifying the associated object and the parent object of the associated object.

10. The data storage system of claim 9, wherein the attribute value repository comprises a plurality of data storage systems, and wherein the plurality of values is partitioned based on the composite key of each of the plurality of values.

11. A data storage method comprising:
storing a plurality of classifications, each classification comprising one or more attributes;
storing a plurality of object definitions, each object definition associated with one or more of the plurality of classifications;
storing a plurality of objects, each object associated with one of the plurality of object definitions;
providing a set of available attributes for a classification;
providing a set of available attributes for an object definition by providing the set of available attributes for each classification associated with the object definition;
providing a set of available attributes for an object by providing the set of available attributes for the object definition associated with the object;
storing a plurality of values in an attribute value repository, each value associated with one of the plurality of objects and one of the attributes in the set of available attributes for the object; and
retrieving the values associated with a selected object from within the attribute value repository independently of any available attributes that are not in use.

12. The method of claim 11, further comprising:
storing one or more classification relationships, each classification relationship associating a child classification with a parent classification;
storing one or more object definition relationships, each object definition relationship associating a child object definition with a parent object definition;
storing one or more object relationships, each object definition relationship associating a child object with a parent object;
including the set of available attributes for a parent classification associated with a classification in the set of available attributes for a classification;
including the set of available attributes for a parent object definition associated with an object definition in the set of available attributes for the object definition; and including the set of available attributes for a parent object associated with an object in the set of available attributes for the object.

13. The method of claim 11, further comprising:

providing a dynamic form builder configured to create a new object by:

receiving an object definition, generating one or more user interface elements enabling a user to input a data value corresponding to each available attribute of the set of available attributes of the object definition, storing an object in the object repository corresponding to the object definition, and storing the input data values corresponding to each available attribute associated with the object in the attribute value repository.

14. The method of claim 11, wherein the dynamic form builder is further configured to create one or more child objects for an object by:

retrieving one or more child object definitions for the object, each child object definition having the object definition for the object as an associated parent definition;

generating one or more user interface elements enabling a user to select a child object definition; and creating an object based on the child object definition.

15. The method of claim 11, wherein each attribute comprises one or more constraints, each constraint having a constraint type selected from the group consisting of: valid value constraints, minimum value constraints, maximum value constraints, and user-defined expression constraints.

16. The method of claim 15, further comprising verifying that a value is compliant with the constraints for the associated attribute.

17. The method of claim 11, further comprising storing a composite key comprising data elements identifying the associated object for each value of the plurality of values and partitioning the plurality of values based on the composite key of each of the plurality of values.

* * * * *